United States Patent
Willard et al.

(10) Patent No.: US 10,773,579 B2
(45) Date of Patent: Sep. 15, 2020

(54) VEHICLE ROOF HAVING A ROOF OPENING SYSTEM

(71) Applicant: Webasto SE, Stockdorf (DE)

(72) Inventors: Michael T. Willard, Harrison Township, MI (US); Paul Finch, Northville, MI (US); Ryan Mitchell, Novi, MI (US); Dennis Felker, Brighton, MI (US)

(73) Assignee: WEBASTO SE, Stockdorf (DE)

( * ) Notice: Subject to any disclaimer, the term of this patent is extended or adjusted under 35 U.S.C. 154(b) by 108 days.

(21) Appl. No.: 16/200,926

(22) Filed: Nov. 27, 2018

(65) Prior Publication Data

US 2020/0164730 A1    May 28, 2020

(51) Int. Cl.
*B60J 7/16* (2006.01)
*B60J 7/19* (2006.01)
*B60J 7/11* (2006.01)

(52) U.S. Cl.
CPC ............ *B60J 7/1642* (2013.01); *B60J 7/11* (2013.01); *B60J 7/19* (2013.01)

(58) Field of Classification Search
CPC ............ B60J 7/1642; B60J 7/19; B60J 7/11
See application file for complete search history.

(56) References Cited

U.S. PATENT DOCUMENTS

| | | | |
|---|---|---|---|
| 2014/0246885 A1* | 9/2014 | Inzerillo | B60J 7/02 296/218 |
| 2016/0263975 A1* | 9/2016 | Bowles | B60J 7/1291 |
| 2019/0329638 A1* | 10/2019 | Willard | B60J 7/194 |

* cited by examiner

*Primary Examiner* — D Glenn Dayoan
*Assistant Examiner* — Melissa Ann Bonifazi
(74) *Attorney, Agent, or Firm* — Fitch, Even, Tabin & Flannery, LLP (57) ABSTRACT

A vehicle roof is provided having a roof opening limited by a fixed roof portion which is immobile relative to a vehicle body, and a roof opening system having a lid element which can be selectively displaced between a closed position, in which the roof opening is closed, and an open position, in which the roof opening is open, wherein the lid element comprises at least one rigid panel which is disposed on a support arrangement which is mounted via a multi-bar linkage on either side of a vertical longitudinal center plane of the roof, wherein an actuation handle is connected to the bilaterally disposed multi-bar linkages, allowing the lid element to be displaced between the closed position and the open position by manual actuation of the multi-bar linkage.

13 Claims, 8 Drawing Sheets

VEHICLE ROOF HAVING A ROOF OPENING SYSTEM

FIELD

A vehicle roof is provided having a roof opening and a roof opening system.

BACKGROUND

A vehicle roof having a roof opening and a roof opening system is known from practice. The roof opening system of said vehicle roof may have a lid element which can be selectively displaced between a closed position, in which the roof opening is closed, and an open position, in which the roof opening is open. The lid element is provided with a support element on either side of a vertical longitudinal center plane of the roof, said support element being coupled with a kinematic arrangement guided in a respective guide rail. The bilaterally disposed kinematic arrangements may each have a drive slide which can be driven by means of a drive cable driven by motor or manually. Such a kinematic arrangement having a guide rail requires sufficient installation space within the vehicle roof.

SUMMARY

The object of the present disclosure is to provide a vehicle roof of the kind described above whose roof opening system is provided with a constructively simple displacement mechanism for the lid element and which requires little installation space.

According to one approach, a vehicle roof is proposed which comprises a roof opening which is limited by a fixed roof portion which is immobile relative to a vehicle body, and a roof opening system having a lid element which can be selectively displaced between a closed position, in which the roof opening is closed, and an open position, in which the roof opening is open, wherein the lid element comprises a rigid panel which is disposed on a support arrangement which is mounted on the fixed roof portion and/or on a roof side beam associated with the fixed roof portion via a multi-bar linkage on either side of a vertical longitudinal center plane of the roof, wherein an actuation handle is connected to the bilaterally disposed multi-bar linkages, allowing the lid element to be displaced between the closed position and the open position by manual actuation of the multi-bar linkage.

By means of the actuation handle, a manually exerted force can be introduced directly into the bilaterally disposed multi-bar linkages. This ensures symmetrical force introduction into the multi-bar linkages with respect to the vertical longitudinal center plane of the roof. The actuation handle, which can be gripped from the interior of the vehicle, enables the user to displace the lid element between the closed position and the open position from within the vehicle interior.

In a specific embodiment of the vehicle roof, the two multi-bar linkages each comprise an inner link and an outer link with respect to the vertical longitudinal center plane of the roof, one side of the inner link being linked to the support arrangement on which the panel of the lid element is disposed and the other side being linked to the fixed roof portion, the two inner links being connected to each other via the actuation handle.

To allow favorable force introduction and high comfort of use, the inner links are each formed by an L-shaped link having a short leg and a long leg, the actuation handle being linked thereto in the area of transition between the short leg and the long leg.

In a specific embodiment of the proposed vehicle roof, the support arrangement on which the at least one rigid roof panel is disposed comprises two peripheral legs, which are disposed close to the edge on the underside of the lid element, and a center leg, which is disposed in the area of the vertical longitudinal center plane of the roof, the two peripheral legs and the center leg being connected to each other via a base leg, which extends in the transverse direction of the roof. When two panels are used to form the lid element, the two panels can be adjacent to each other. Advantageously, a weather strip which prevents moisture from entering the vehicle interior when the lid element is in the closed position is disposed between the two panels.

To clearly define the open position of the lid element, a stop element can be in provided which is attached to the fixed roof portion. For example, the inner links of the multi-bar linkages abut against the stop element when the lid element is in the open position.

To secure the open position of the lid element on the one hand and to support manual actuation of the multi-bar linkage on the other hand, a gas pressure spring can be provided on each of the two multi-bar linkages, each gas pressure spring being linked to a link of the respective multi-bar linkage on one side and to the support arrangement for the at least one rigid panel on the other side.

Furthermore, a latching pin may be provided on each of the two bilaterally disposed multi-bar linkages, said latching pin securing the respective multi-bar linkage when the lid element is in the open position. The latching pin is preferably provided with a restoring spring which pre-loads it in the direction of its locked position.

Furthermore, the proposed vehicle roof preferably has a lock which secures the lid element in its closed position. Said lock is disposed in particular on the underside of the lid element and can be engaged with a windshield header of the vehicle in question, i.e. with an upper frame leg of a windshield frame, when the lid element is in the closed position.

According to another aspect, a vehicle roof is proposed which comprises a roof opening which limited by a fixed roof portion which is immobile relative to a vehicle body, and a roof opening system having a lid element which can be selectively displaced between a closed position, in which the roof opening is closed, and an open position, in which the roof opening is open, wherein the lid element comprises at least one rigid panel which is disposed on a support arrangement which is mounted via a multi-bar linkage on either side of a vertical longitudinal center plane of the roof, wherein the support arrangement comprises two lateral peripheral legs and one center leg, wherein the two peripheral legs and the center leg are connected to each other via a base leg which extends in the transverse direction of the roof, wherein the two bilaterally disposed multi-bar linkages each in comprise a link that is linked to the respective peripheral leg and each comprise a link that is linked to the center leg.

According to another aspect, a vehicle roof is proposed which comprises a roof opening which limited by a fixed roof portion which is immobile relative to a vehicle body, and a roof opening system having a lid element which can be selectively displaced between a closed position, in which the roof opening is closed, and an open position, in which the roof opening is open, wherein the lid element comprises at least one rigid panel which is disposed on a support arrangement which is mounted via a multi-bar linkage on either side of a vertical longitudinal center plane of the roof, wherein at least one actuator is provided which supports manual actuation of the multi-bar linkages in the direction of the open position and/or of the closed position of the lid element.

According to another aspect, a vehicle roof is proposed which comprises a roof opening which limited by a fixed roof portion which is immobile relative to a vehicle body, and a roof opening system having a lid element which can be selectively displaced between a closed position, in which the roof opening is closed, and an open position, in which the roof opening is open, wherein the lid element comprises at least one rigid panel which is disposed on a support arrangement which is mounted via a multi-bar linkage on either side of a vertical longitudinal center plane of the roof, wherein the multi-bar linkages are each formed by a scissor lever mechanism which comprises four links which are connected to each other via three points of articulation, wherein the scissor lever mechanisms are each linked to the support arrangement via two points of articulation and to the fixed roof portion via two points of articulation.

According to another aspect, a vehicle is proposed which is configured as an all-terrain vehicle and which comprises a vehicle roof of the kind described above.

Other advantages and advantageous embodiments of the subject-matter of the invention are apparent from the description, the drawings, and the claims.

BRIEF DESCRIPTION OF THE DRAWINGS

In the drawings, embodiments of a vehicle roof according to the invention are illustrated by way of example in a schematically simplified manner and will be explained in more detail in the following description.

DETAILED DESCRIPTION OF THE PREFERRED EMBODIMENTS

FIGS. 1 to 5 show a motor vehicle 10 which is configured as an all-terrain vehicle and comprises a vehicle body 12 which is provided with a vehicle roof 14 which extends in the longitudinal direction of the vehicle from a windshield header 16 to a rear-side edge 18, where it ends in a substantially vertical vehicle rear. The vehicle roof 14 comprises a fixed roof portion 20 which is immobile relative to the vehicle body 12 and which covers a back seat and a rear-side storage space of the motor vehicle 10. Furthermore, the vehicle roof 14 comprises a roof opening 22 which is limited by the fixed roof portion 20 at the rear, by the windshield header 16 at the front, and by roof side beams 24A and 24B at the sides. The roof side beams 24A and 24B are immobile relative to the vehicle body 12 and can be assigned to the fixed roof portion 20.

Figure 1:
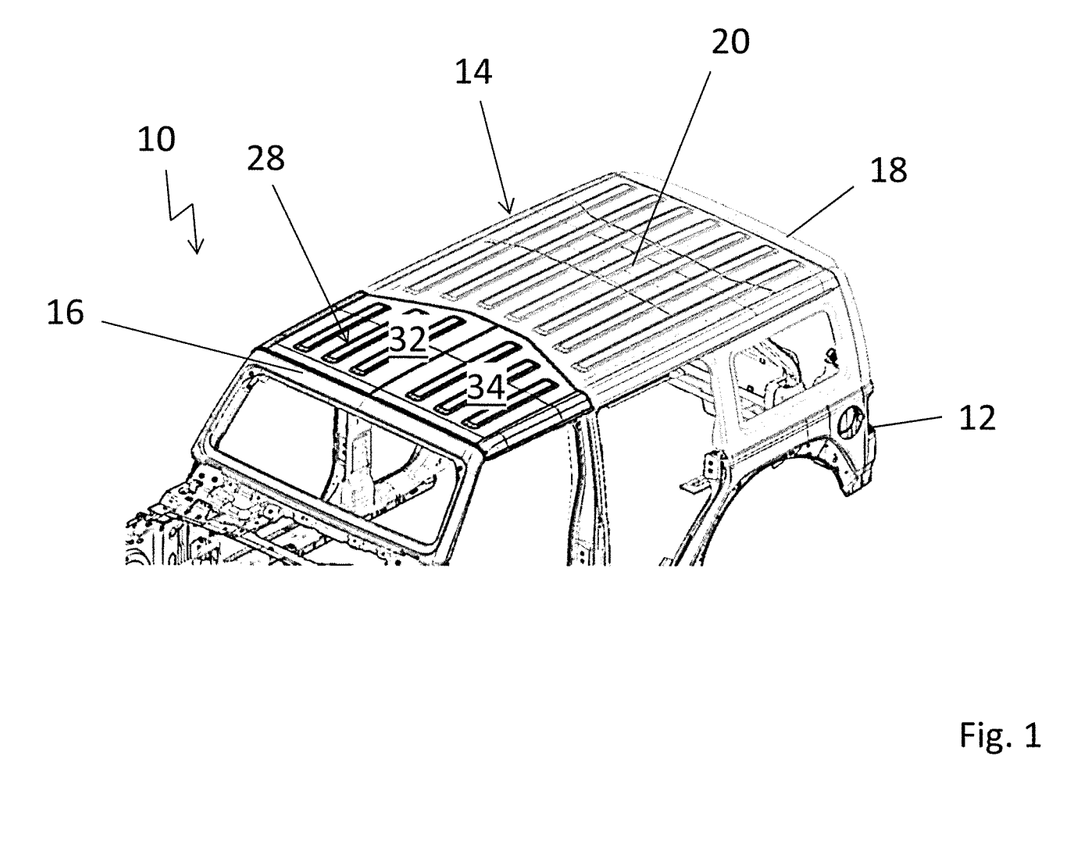
FIG. 1 shows an illustration of a section of an all-terrain vehicle having a vehicle roof that comprises a roof opening system with a lid element in a closed position.
Figure 2:
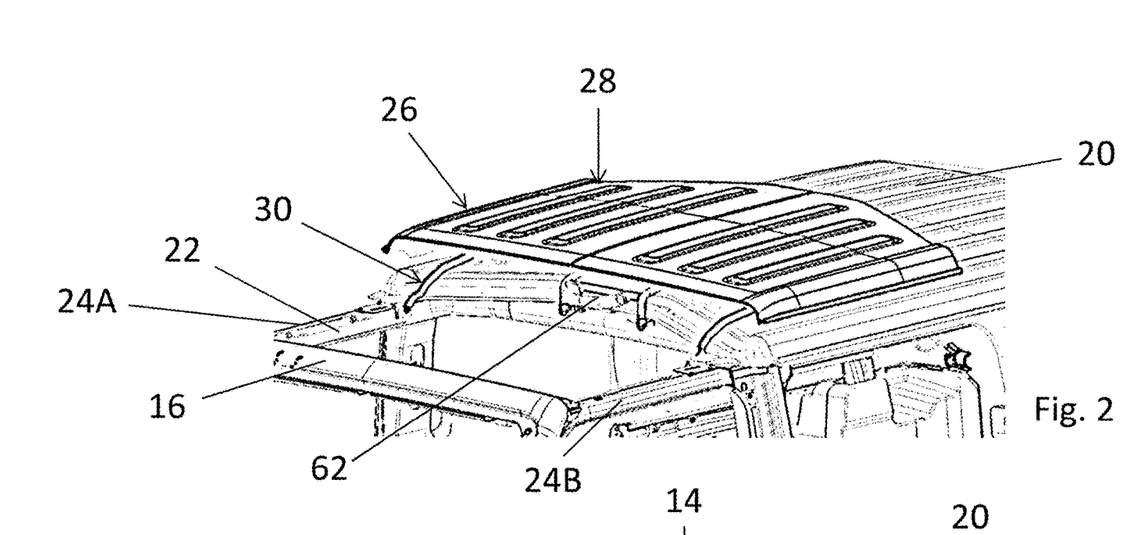
FIG. 2 shows an illustration of a section of the all-terrain vehicle of FIG. 1, but with the lid element in an open position.
Figure 3:
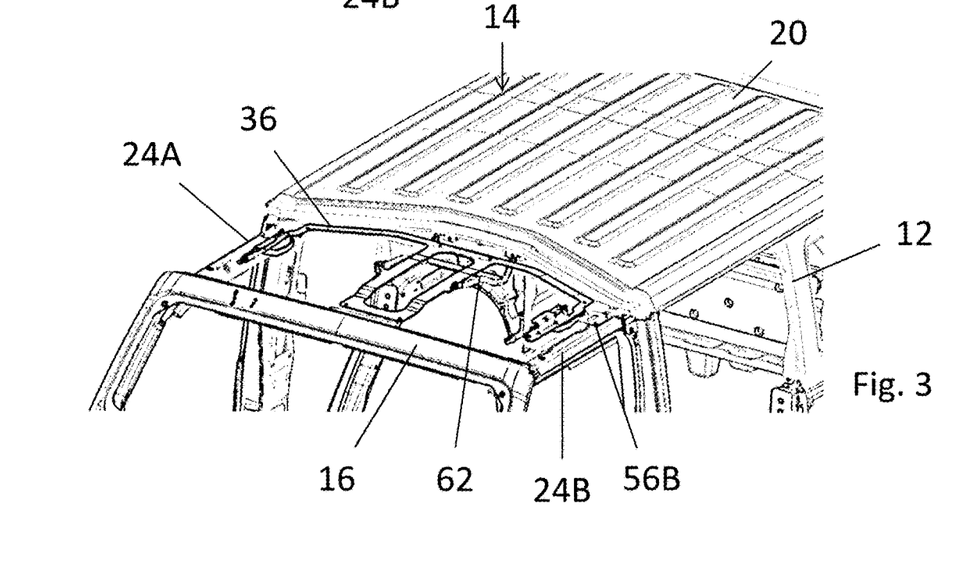
FIG. 3 shows a view corresponding to FIG. 1, but without illustration of panels of the lid element.
Figure 4:
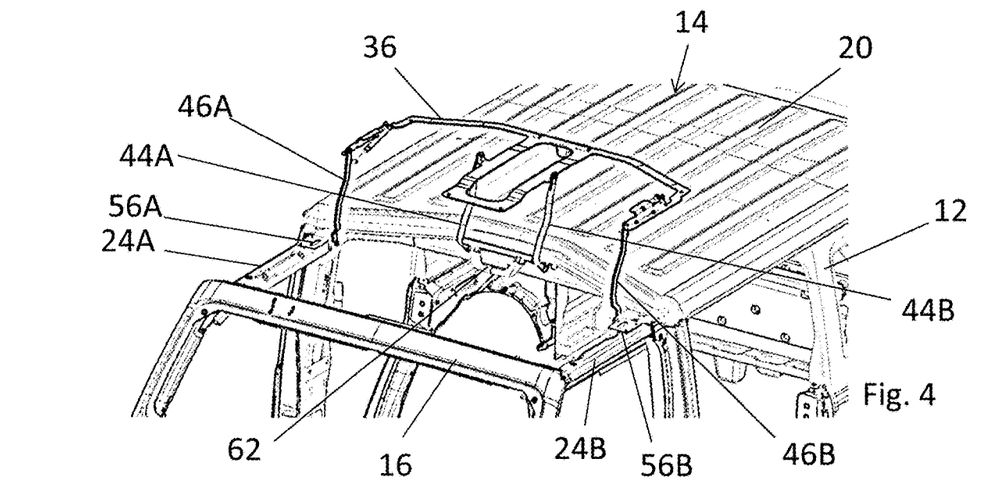
FIG. 4 shows a view of the all-terrain vehicle corresponding to FIG. 3, but with the lid element in an intermediate position.
Figure 5:
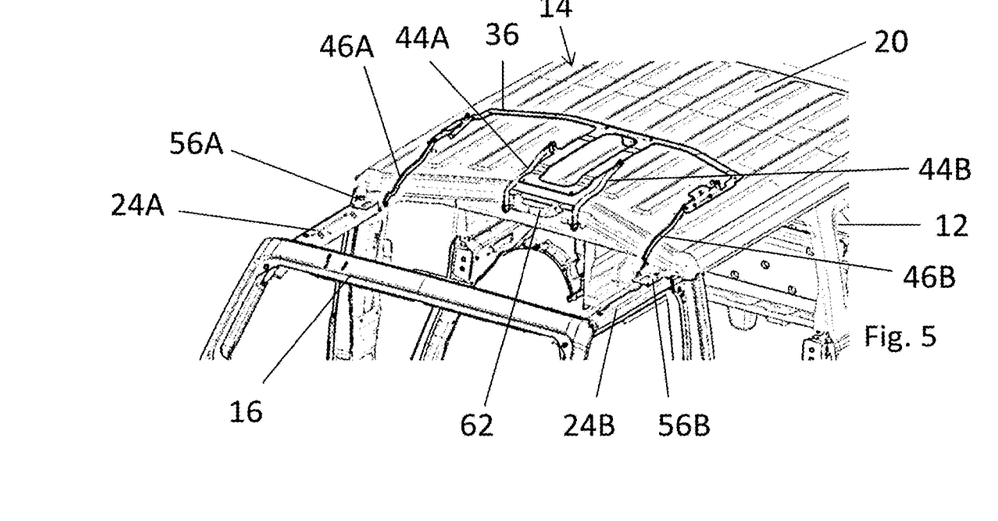
FIG. 5 also shows a view of the all-terrain vehicle corresponding to FIG. 3, but with the lid element in an open position.
Figure 6:
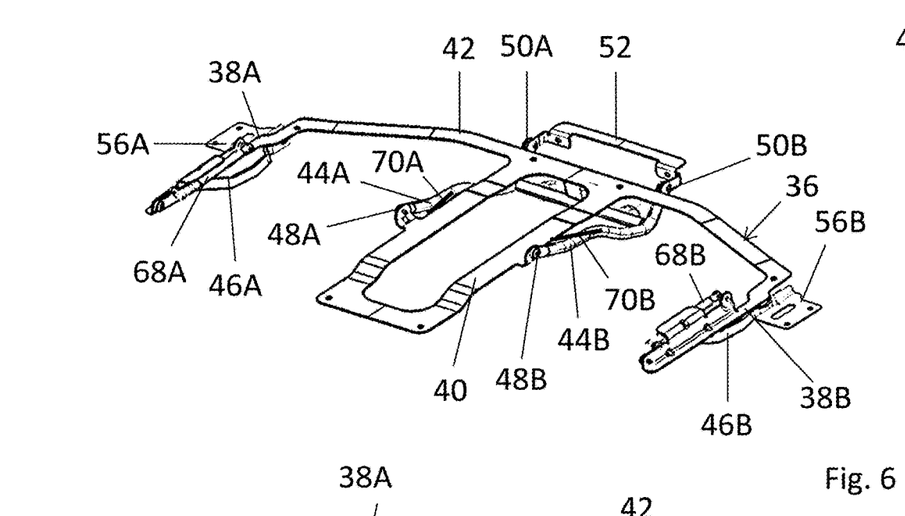
FIG. 6 shows a perspective view of a support arrangement of the lid element together with multi-bar linkages for displacing the lid element, with the lid element in the closed position.
Figure 7:
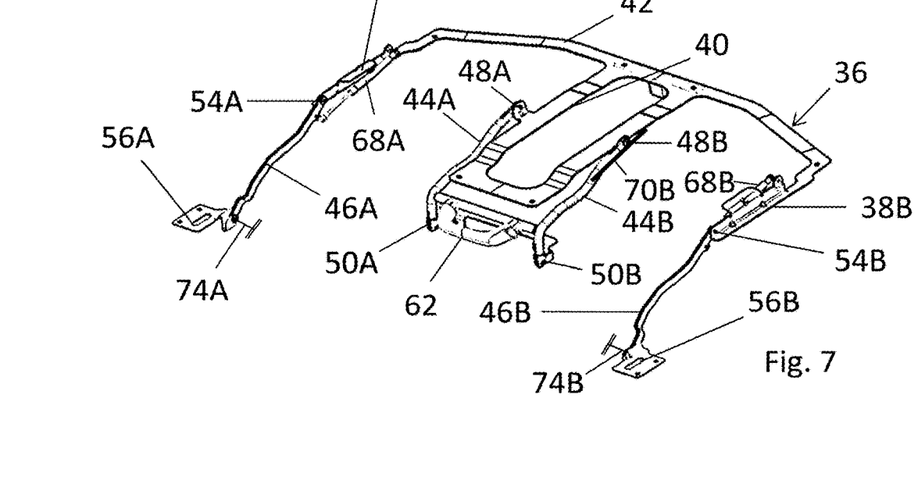
FIG. 7 shows a view of the support arrangement and of the multi-bar linkages corresponding to FIG. 6, but with the lid element in the open position.

The vehicle roof 14 is provided with a roof opening system 26 which comprises a lid element 28 which can be displaced between a closed position, which is illustrated in FIG. 1 and in which the roof opening 22 is closed, and an open position, which is illustrated in FIG. 2 and in which the roof opening 22 is open, by means of displacement kinematics 30. In the open position, the lid element 28 is disposed above the rear-side fixed roof portion 20. The lid element 28 comprises two roof panels 32 and 34, which are at least largely mirror-symmetrical with respect to a vertical longitudinal center plane of the roof and which are fixed on top of a support arrangement 36 which is linked to the displacement kinematics 30.

The roof opening system 26 is illustrated on its own in FIGS. 6 to 10.

The support arrangement 36 comprises a peripheral leg 38A, 38B on either side of the vertical longitudinal center plane of the roof and a frame-like center leg 40. The peripheral legs 38A and 38B and the center leg 40 are connected to each other via a base leg 42 which extends substantially in the transverse direction of the roof.

The displacement kinematics 38, to which the support arrangement 36 is linked, comprise a multi-bar linkage on either side of the vertical longitudinal center plane of the roof, each multi-bar linkage being configured as a four-bar linkage and comprising an inner link 44A, 44B and an outer link 46A, 46B. The inner links 44A and 44B are each linked to the center leg 40 of the support arrangement via a point of articulation 48A, 48B. At their ends facing away from the center leg 40, the inner links 44A and 44B are each linked to a mounting bracket 52 via a point of articulation 50A, 50B, said mounting bracket 52 being fixedly disposed on the underside of the fixed roof portion 20. The outer links 46A and 46B are each linked to the respective peripheral leg 38A, 38B via a point of articulation 54A, 54B. At their other ends, the outer links 46A and 46B are linked to mounting plates 56A and 56B which, when in the installed state, are attached to the roof side beams 24A and 24B.

Figure 8:
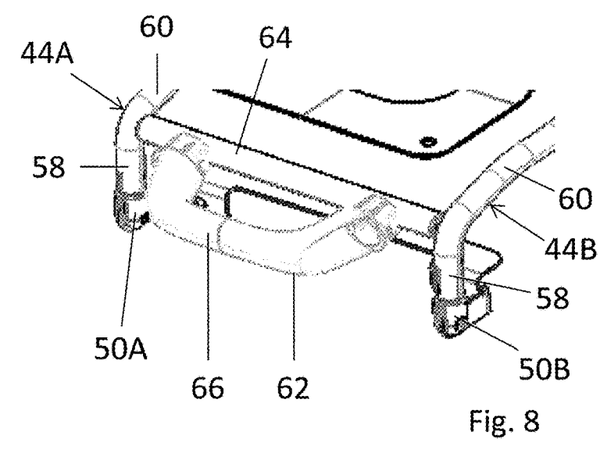
FIG. 8 shows an enlarged view of an actuation handle of the multi-bar linkages.

The two inner links 44A and 44B are each substantially L-shaped and each have a short leg 58 and a long leg 60. In the area of transition between the short legs 58 and the long legs 60, the two inner links 44A and 44B are connected to each other via an actuation handle 62 which comprises a base bar 64 and a gripping bracket 66. The gripping bracket 66 can be gripped by a user or vehicle passenger both in the open position and in the closed position of the lid element 28, allowing the displacement kinematics formed by the four-bar linkages to be manually actuated.

When the lid element 28 is in the open position, the mounting bracket 52 forms a stop element for the inner links 44A and 44B, the open position of the lid element 28 thus being defined clearly.

Figure 9:
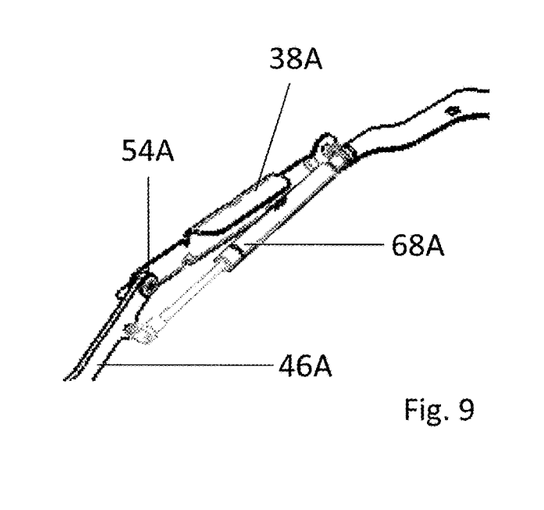
FIG. 9 shows an enlarged view of a gas pressure spring of the multi-bar linkages.
Figure 10:
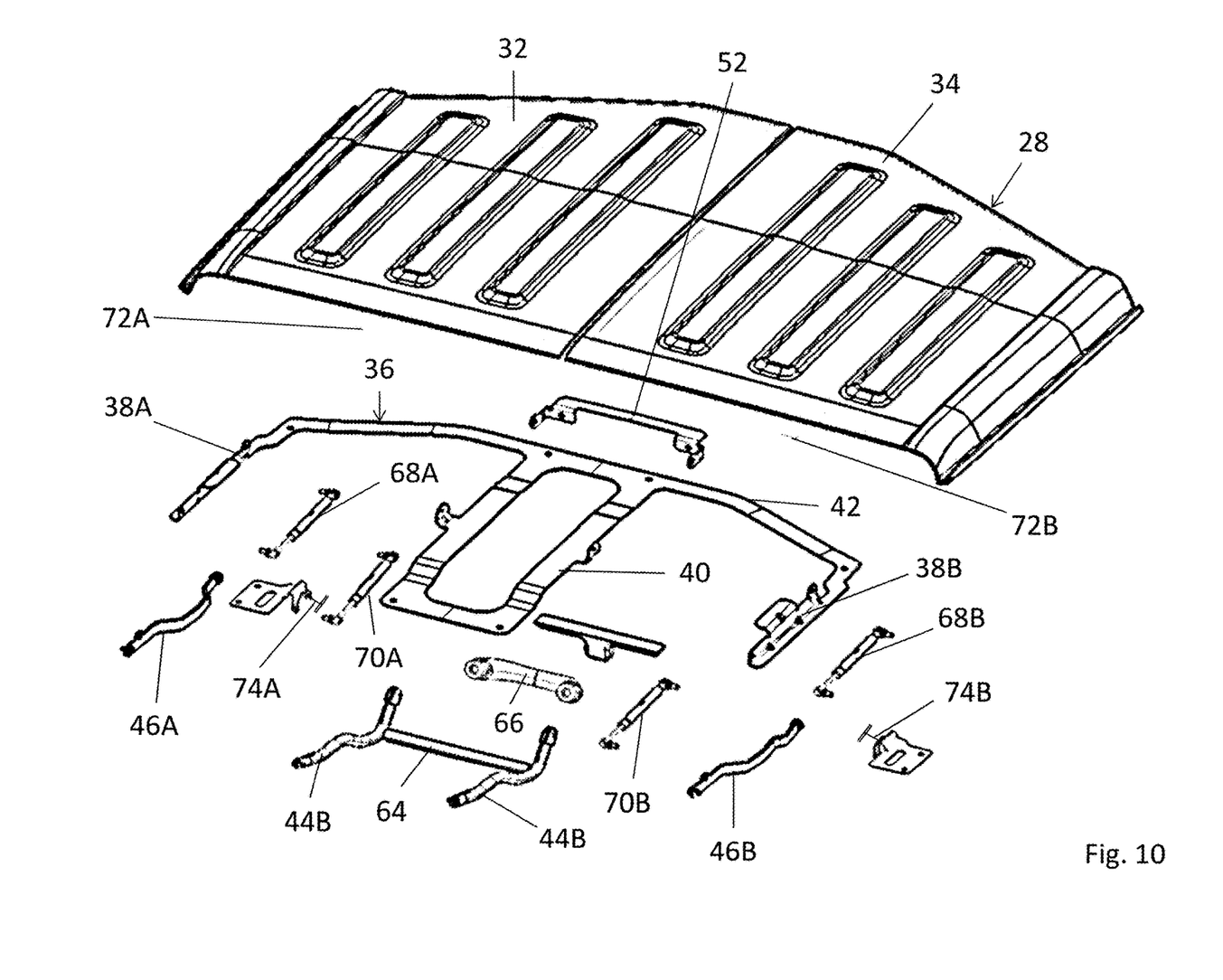
FIG. 10 shows an overview illustration of the individual parts of the roof opening system.

To support the displacing movement of the lid element 28 from the closed position into the open position, a gas pressure spring 68A, 68B is linked to each of the two peripheral legs 38A and 38B of the support arrangement 36, the respective other end of said gas pressure spring 68A, 68B being linked to the respective outer link 46A, 46B. Moreover, another gas pressure spring 70A, 70B is provided between the center leg 40 and the inner links 44A and 44B to support the closing movement, i.e. displacement of the lid element 28 into the closed position.

Two locking elements 72A and 72B which can be engaged with the windshield header 16 of the vehicle 10 when the lid element 28 is in the closed position are disposed on the underside of the roof panels 32 and 34. The locking elements 72A and 72B are each configured in the manner of a toggle clamp or toggle-type fastener.

Figure 11:
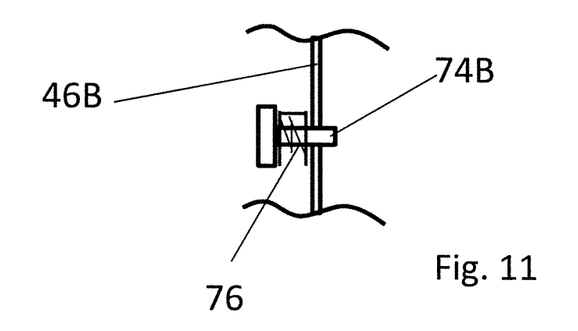
FIG. 11 shows a latching pin for one of the multi-bar linkages.
Figure 12:
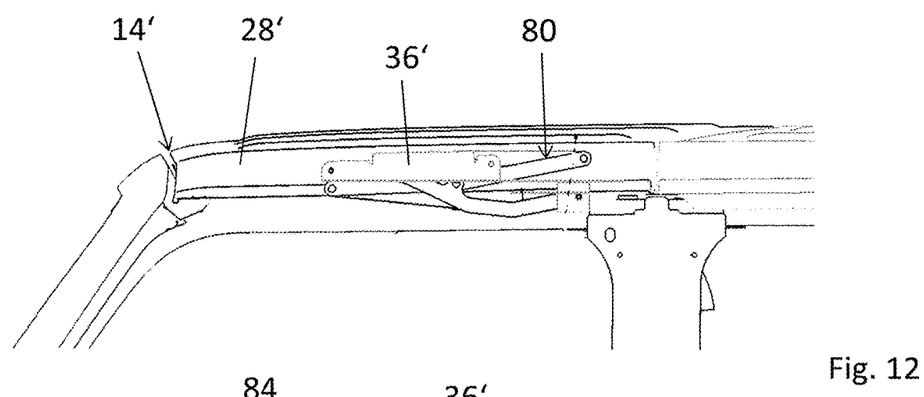
FIG. 12 shows a side view of an alternative embodiment of a vehicle roof with a lid element in a closed position.
Figure 13:
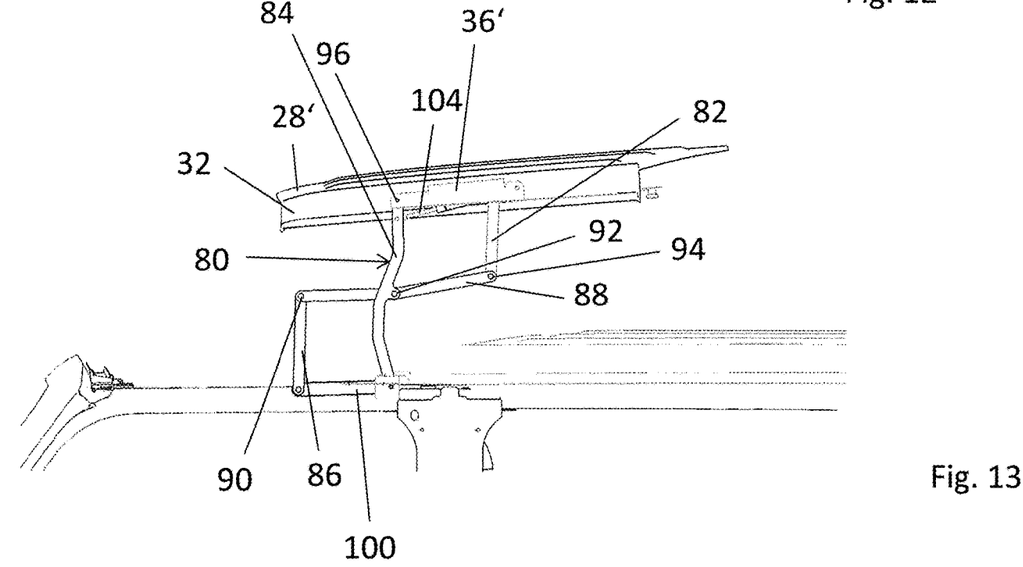
FIG. 13 shows a view of the vehicle roof corresponding to FIG. 12, but with the lid element in an intermediate position.
Figure 14:
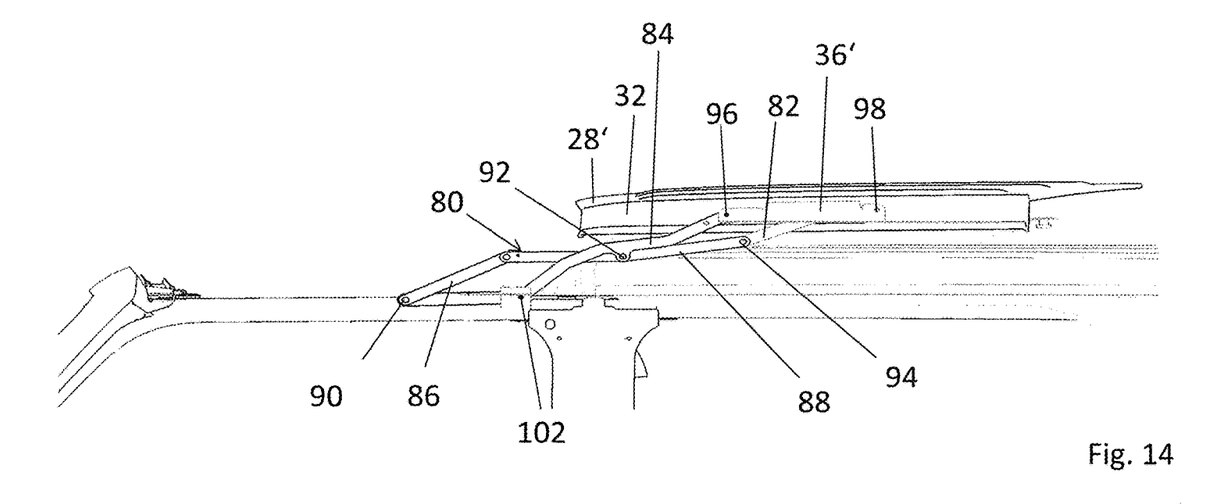
FIG. 14 shows a view of the vehicle roof corresponding to FIG. 12, but with the lid element in an open position.
Figure 15:
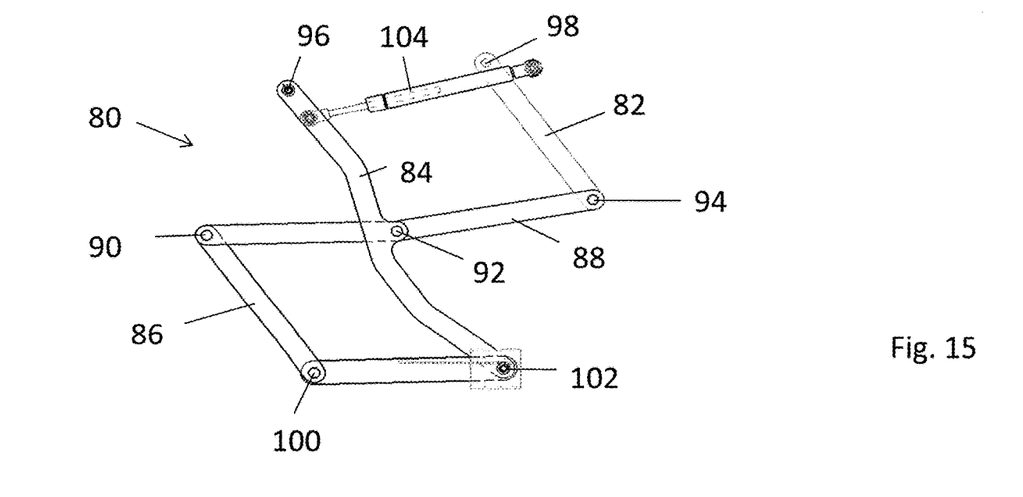
FIG. 15 shows a multi-bar linkage of the vehicle roof according to FIGS. 12 to 14.

Furthermore, a latching pin 47A, 47B is mounted on each of the mounting plates 56A and 56B, said latching pin 74A, 74B being pre-loaded, by means of a respective restoring spring 76, into a locked position in which it is engaged with a corresponding latching recess of the respective outer link 64A, 64B when the lid element 28 is in the open position.

In FIGS. 12 to 15, another embodiment of a vehicle roof 14' of a motor vehicle of the kind illustrated in FIGS. 1 to 5 is shown. The vehicle roof 14' comprises a lid element 28' which is formed by a one-piece roof panel 32 which is fixed on top of a support arrangement 36'. The support arrangement 36' is connected to the roof side beams 24A and 24B via a multi-bar linkage 80 on either side of a vertical longitudinal center plane of the roof. The multi-bar linkages 80 are each formed by a scissor lever mechanism which comprises four links 82, 84, 86, and 88 which are connected to each other via three points of articulation 90, 92, and 94. Links 82 and 84 are linked to the support arrangement 36' of the lid element 28' via points of articulation 96 and 98. Links 84 and 86 are linked to the respective roof side beam 24A, 24B of the vehicle body via two points of articulation 100 and 102. Otherwise, the vehicle roof 14' corresponds to the vehicle roof 14 according to FIGS. 1 to 10. Further, a gas spring 104 is provided which is connected to the lid element 28' and to link 84 and which facilitates the manual actuation of the lid element 28' between the closed position and the open position.

The invention claimed is:

1. A vehicle roof, comprising: a roof opening which is limited by a fixed roof portion which is immobile relative to a vehicle body, and a roof opening system having a lid element which can be selectively displaced between a closed position, in which the roof opening is closed, and an open position, in which the roof opening is open, wherein the lid element comprises at least one rigid panel which is disposed on a support arrangement which is mounted via a multi-bar linkage on either side of a vertical longitudinal center plane of the roof, wherein an actuation handle is connected to the bilaterally disposed multi-bar linkages, allowing the lid element to be displaced between the closed position and the open position by manual actuation of the multi-bar linkage.

2. The vehicle roof according to claim 1, wherein the multi-bar linkages each comprise an inner link and an outer link with respect to the vertical longitudinal center plane of the roof and the inner link is linked to the support arrangement on one side and to the fixed roof portion on the other side, the two inner links being connected to each other via the actuation handle.

3. The vehicle roof according to claim 2, wherein the inner links are each formed by an L-link having a short leg and a long leg and the actuation handle is linked thereto in the area of transition between the short leg and the long leg.

4. The vehicle roof according to claim 1, wherein the support arrangement comprises two lateral peripheral legs and one center leg and the two peripheral legs and the center leg are connected to each other via a base leg which extends in the transverse direction of the roof.

5. The vehicle roof according to claim 1, wherein a stop element is provided which is attached to the fixed roof portion and which defines the open position of the lid element.

6. The vehicle roof according to claim 1, wherein the open position of the lid element is secured by means of at least one gas pressure spring which is linked to a link of the multi-bar linkages on one side and to the support arrangement on the other side.

7. The vehicle roof according to claim 1, wherein a latching pin is provided which secures the multi-bar linkage when the lid element is in the open position.

8. The vehicle roof according to claim 7, wherein the latching pin is provided with a restoring spring that pre-loads it in the direction of its locked position.

9. The vehicle roof according to claim 1, wherein a lock is provided which secures the lid element in its closed position.

10. The vehicle roof according to claim 1, wherein an actuator is provided which supports manual actuation of the multi-bar linkages.

11. A vehicle roof, comprising a roof opening which is limited by a fixed roof portion which is immobile relative to a vehicle body, and a roof opening system having a lid element which can be selectively displaced between a closed position, in which the roof opening is closed, and an open position, in which the roof opening is open, wherein the lid element comprises at least one rigid panel which is disposed on a support arrangement which is mounted via a multi-bar linkage on either side of a vertical longitudinal center plane of the roof, wherein the support arrangement comprises two lateral peripheral legs and one center leg and the two peripheral legs and the center leg are connected to each other via a base leg which extends in the transverse direction of the roof, wherein the two bilaterally disposed multi-bar linkages each comprise a link that is linked to the respective peripheral leg and each comprise a link that is linked to the center leg.

12. A vehicle roof, comprising a roof opening which is limited by a fixed roof portion which is immobile relative to a vehicle body, and a roof opening system having a lid element which can be selectively displaced between a closed position, in which the roof opening is closed, and an open position, in which the roof opening is open, wherein the lid element comprises at least one rigid panel which is disposed on a support arrangement which is mounted via a multi-bar linkage on either side of a vertical longitudinal center plane of the roof, wherein at least one actuator is provided which supports manual actuation of the multi-bar linkages in the direction of the open position and/or of the closed position of the lid element.

13. A vehicle roof, comprising a roof opening which is limited by a fixed roof portion which is immobile relative to a vehicle body, and a roof opening system having a lid element which can be selectively displaced between a closed position, in which the roof opening is closed, and an open position, in which the roof opening is open, wherein the lid element comprises at least one rigid panel which is disposed on a support arrangement which is mounted via a multi-bar linkage on either side of a vertical longitudinal center plane of the roof, wherein the multi-bar linkages are each formed by a scissor lever mechanism which comprises four links which are connected to each other via three points of articulation, wherein the scissor lever mechanisms are each linked to the support arrangement via two points of articulation and to the fixed roof portion via two points of articulation.

* * * * *